(12) United States Patent
Chang et al.

(10) Patent No.: US 10,825,220 B1
(45) Date of Patent: Nov. 3, 2020

(54) COPY POSE

(71) Applicant: Pixar, Emeryville, CA (US)

(72) Inventors: Juei Chang, Sacramento, CA (US); Tom Hahn, Piedmont, CA (US)

(73) Assignee: Pixar, Emeryville, CA (US)

(*) Notice: Subject to any disclaimer, the term of this patent is extended or adjusted under 35 U.S.C. 154(b) by 648 days.

(21) Appl. No.: 14/045,201

(22) Filed: Oct. 3, 2013

(51) Int. Cl.
*G06T 13/00* (2011.01)

(52) U.S. Cl.
CPC ..................... *G06T 13/00* (2013.01)

(58) Field of Classification Search
CPC .......... G06T 13/00; G06T 2207/10028; G06T 13/80; G06T 2207/30196; G06T 7/2046; G06T 7/20; G06T 13/40; G06T 2207/10016; G11B 27/034; A63F 2300/6607; A63F 2300/8011; A63F 2300/69; A63F 2300/8005; A63F 13/10; A63F 2300/1087; G06K 9/00342
See application file for complete search history.

(56) References Cited

U.S. PATENT DOCUMENTS

| | | | | |
|---|---|---|---|---|
| 2010/0302257 A1* | 12/2010 | Perez | ........................ | A63F 13/57 345/474 |
| 2012/0021828 A1* | 1/2012 | Raitt et al. | ........................ | 463/31 |
| 2012/0028706 A1* | 2/2012 | Raitt | ........................ | A63F 13/52 463/31 |
| 2013/0235046 A1* | 9/2013 | Lanciault | ................ | G06T 13/40 345/474 |
| 2014/0253560 A1* | 9/2014 | Niles | ........................ | G06T 13/80 345/473 |

* cited by examiner

Primary Examiner — Barry Drennan
Assistant Examiner — Khoa Vu
(74) Attorney, Agent, or Firm — Kilpatrick Townsend & Stockton LLP (57) ABSTRACT

Techniques are disclosed that allow animators to easily share and reuse character poses such as gestures, expressions, and mouth shapes. When starting on a new shot, an animator often wants a character to have the same pose exactly as the end of the previous shot. According to various embodiments, an animator can easily set up these hookup poses by animator copying a pose directly from a clip of prerecorded media. In one aspect, a pose at the current playhead of the playback tool is copied into a software buffer of an animation tool and then pasted into a character. Thus, the animator may copy a pose exactly as he/she is seeing visually. In various aspects, animators can choose a pose from an entire inventory of available animated videos. This provides a more efficient method for selecting a pose since the user can easily choose and pick a pose from a large inventory of animated videos and bring in a desired pose in a matter of a few mouse clicks.

20 Claims, 9 Drawing Sheets

COPY POSE

BACKGROUND

This disclosure relates to computer-generated imagery (CGI) and computer-aided animation. More specifically, this disclosure relates to techniques for copying poses or animation frame data for use in CGI and computer-aided animation.

With the wide-spread availability of computers, computer graphics artists and animators can rely upon computers to assist in production process for creating animations and computer-generated imagery (CGI). This may include using computers to have physical models be represented by virtual models in computer memory. Typically, two-dimensional (2D) or three-dimensional (3D) computer-aided animation combines 2D/3D models of objects and programmed movement of one or more of the models. In 3D computer animation, the first step is typically the object modeling process. Objects can be sculpted much like real clay or plaster, working from general forms to specific details, for example, with various sculpting tools. Models may then be constructed, for example, out of geometrical vertices, faces, and edges in a 3D coordinate system to represent the objects. These virtual models can then be manipulated using computers to, for example, simulate physics, design aesthetic actions such as poses or other deformations, crate lighting, coloring and paint, or the like, of characters or other elements of a computer animation display.

For movies, other animated features, shorts, and special effects, a user (e.g., a skilled computer graphics artist) can specify the geometric or mathematical description of objects to be used in a rendered image or animation sequence, such as characters, props, background, or the like. In some instances, the geometric description of the objects may include a number of animation control variables (avars) and values for the avars. An animator may also pose the objects within the image or sequence and specify motions and positions of the objects over time to create an animation.

One issue with the production process is the time and effort involved when a user undertakes to animate a scene. It may take several hours to several days for the user to pose or otherwise prepare a model that can be used to produce a visually desired look. Accordingly, what is desired is to solve problems relating to copying poses or animation frame data, some of which may be discussed herein. Additionally, what is desired is to reduce drawbacks relating to copying poses or animation frame data, some of which may be discussed herein.

BRIEF SUMMARY

The following portion of this disclosure presents a simplified summary of one or more innovations, embodiments, and/or examples found within this disclosure for at least the purpose of providing a basic understanding of the subject matter. This summary does not attempt to provide an extensive overview of any particular embodiment or example. Additionally, this summary is not intended to identify key/critical elements of an embodiment or example or to delineate the scope of the subject matter of this disclosure. Accordingly, one purpose of this summary may be to present some innovations, embodiments, and/or examples found within this disclosure in a simplified form as a prelude to a more detailed description presented later.

Techniques are disclosed that allow animators to easily share and reuse character poses such as gestures, expressions, and mouth shapes. When starting on a new shot, an animator often wants a character to have the same pose exactly as the end of the previous shot. According to various embodiments, an animator can easily set up these hookup poses by animator copying a pose directly from a clip of prerecorded media. In one aspect, a pose at the current playhead of the playback tool is copied into a software buffer of an animation tool and then pasted into a character. Thus, the animator may copy a pose exactly as he/she is seeing visually. In various aspects, animators can choose a pose from an entire inventory of available animated videos. This provides a more efficient method for selecting a pose since the user can easily choose and pick a pose from a large inventory of animated videos and bring in a desired pose in a matter of a few mouse clicks.

In one embodiment, a method for posing characters in animated sequences includes receiving a recorded media visually representing one or more poses of a character being animated using an animation tool. Information is received indicative of a predetermined location in the recorded media. Animation data associated with at least one pose of the character is then determined at the predetermined location of the recorded media that is relevant to one or more controls of the character being animated using the animation tool. The determined animation data is copied into the animation tool such that the character approximates the at least one pose at the predetermined location of the recorded media.

In one aspect, determining the animation data associated with the at least one pose of the character at the predetermined location of the recorded media includes retrieving a reference to the animation data from the recorded media. In another aspect, determining the animation data associated with the at least one pose of the character at the predetermined location of the recorded media includes extracting the animation data from the recorded media. In some embodiments, determining the animation data associated with the at least one pose of the character at the predetermined location of the recorded media includes determining selection criteria based on the recorded media. An asset management system may be queried for the animation data based on the selection criteria.

In further embodiments, receiving the information indicative of the predetermined location in the recorded media includes receiving bounds of an animation frame range. Copying the determined animation data into the animation tool such that the character approximates the at least one pose at the predetermined location of the recorded media may include utilizing a copy and paste operation of the animation tool. Receiving the recorded media visually representing the one or more poses of the character being animated using the animation tool may include selecting one of a plurality of clips associated with the character from a video library.

In one embodiment, a non-transitory computer-readable medium storing computer-executable code for posing characters in animated sequences includes code for receiving a recorded media visually representing one or more poses of a character being animated using an animation tool, code for receiving information indicative of a predetermined location in the recorded media, code for determining animation data associated with at least one pose of the character at the predetermined location of the recorded media that is relevant to one or more controls of the character being animated using the animation tool, and code for copying the determined animation data into the animation tool such that the character approximates the at least one pose at the predetermined location of the recorded media.

In one embodiment, a system for posing characters in animated sequences includes a processor and a memory in communication with the processor and configured to store a set of instructions which when executed by the processor cause the processor to receive a recorded media visually representing one or more poses of a character being animated using an animation tool, receive information indicative of a predetermined location in the recorded media, determine animation data associated with at least one pose of the character at the predetermined location of the recorded media that is relevant to one or more controls of the character being animated using the animation tool, and copy the determined animation data into the animation tool such that the character approximates the at least one pose at the predetermined location of the recorded media.

A further understanding of the nature of and equivalents to the subject matter of this disclosure (as well as any inherent or express advantages and improvements provided) should be realized in addition to the above section by reference to the remaining portions of this disclosure, any accompanying drawings, and the claims.

BRIEF DESCRIPTION OF THE DRAWINGS

In order to reasonably describe and illustrate those innovations, embodiments, and/or examples found within this disclosure, reference may be made to one or more accompanying drawings. The additional details or examples used to describe the one or more accompanying drawings should not be considered as limitations to the scope of any of the claimed inventions, any of the presently described embodiments and/or examples, or the presently understood best mode of any innovations presented within this disclosure.

DETAILED DESCRIPTION

Introduction

In various embodiments, techniques are disclosed that allow users, such as animators, to easily share and reuse character poses such as gestures, expressions, and moth shapes. During an animation process, an animator may desire that a character have the same or similar pose as the end of the previous shot when starting a new shot. Additionally, it is common for characters to have a personality that is expressed through gestures, expressions, and the like that an animator seeks to maintain throughout a project.

In one aspect, one or more mechanisms are provided that allow an animator to easily set up a character with poses associated with recorded media. Therefore, animators can copy one or more poses or animation frame data directly from a clip of prerecorded media. The pose at the current playhead of a playback tool can then be copied into a software buffer of an animation tool and then pasted into a character that. Thus, the animator is copying a pose exactly as the animator is seeing visually with the prerecorded media. In various embodiments, animators can choose a pose or other animation frame data from an entire inventory of available animated videos.

Figure 1:
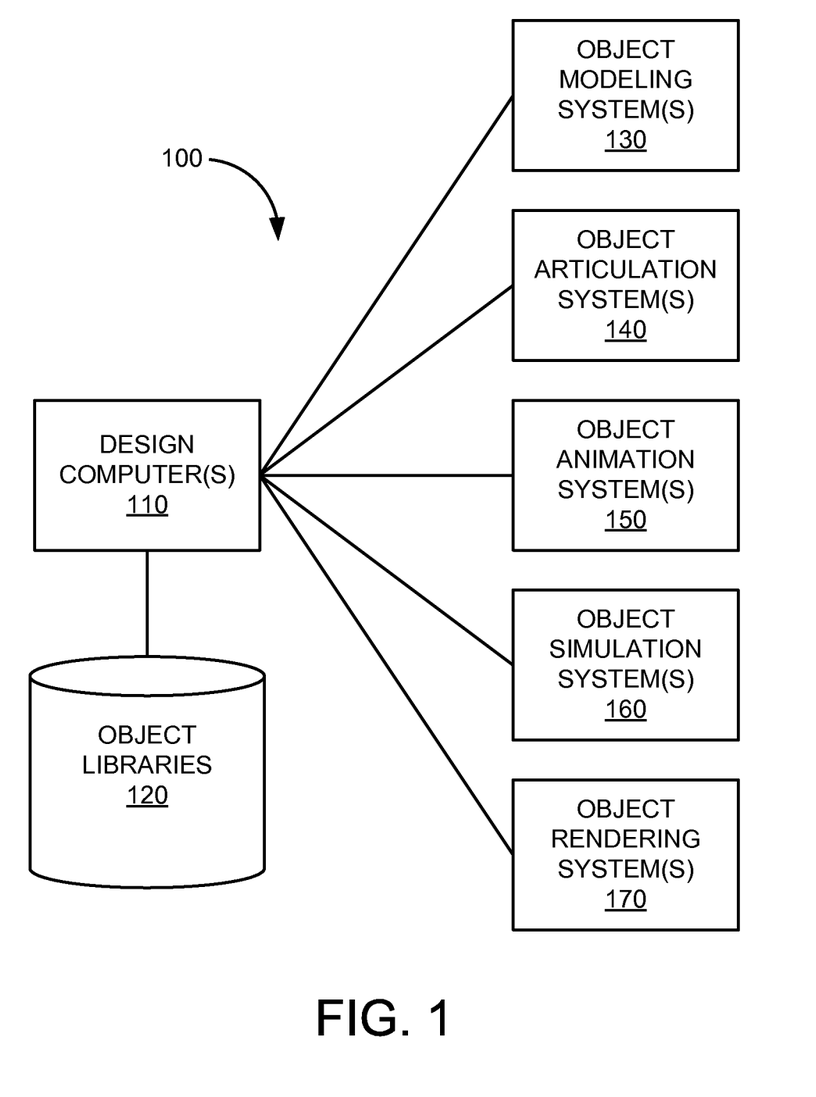
FIG. 1 is a simplified block diagram of a system for creating computer graphics imagery (CGI) and computer-aided animation that may implement or incorporate various embodiments or techniques for copying pose or animation frame data.

FIG. 1 is a simplified block diagram of system 100 for creating computer graphics imagery (CGI) and computer-aided animation that may implement or incorporate various embodiments or techniques for copying pose or animation frame data. In this example, system 100 can include one or more design computers 110, object library 120, one or more object modeler systems 130, one or more object articulation systems 140, one or more object animation systems 150, one or more object simulation systems 160, and one or more object rendering systems 170.

The one or more design computers 110 can include hardware and software elements configured for designing CGI and assisting with computer-aided animation. Each of the one or more design computers 110 may be embodied as a single computing device or a set of one or more computing devices. Some examples of computing devices are PCs, laptops, workstations, mainframes, cluster computing system, grid computing systems, cloud computing systems, embedded devices, computer graphics devices, gaming devices and consoles, consumer electronic devices having programmable processors, or the like. The one or more design computers 110 may be used at various stages of a production process (e.g., pre-production, designing, creating, editing, simulating, animating, rendering, post-production, etc.) to produce images, image sequences, motion pictures, video, audio, or associated effects related to CGI and animation.

In one example, a user of the one or more design computers 110 acting as a modeler may employ one or more systems or tools to design, create, or modify objects within a computer-generated scene. The modeler may use modeling software to sculpt and refine a neutral 3D model to fit predefined aesthetic needs of one or more character designers. The modeler may design and maintain a modeling topology conducive to a storyboarded range of deformations. In another example, a user of the one or more design computers 110 acting as an articulator may employ one or more systems or tools to design, create, or modify controls or animation variables (avars) of models. In general, rigging is a process of giving an object, such as a character model, controls for movement, therein "articulating" its ranges of motion. The articulator may work closely with one or more animators in rig building to provide and refine an articulation of the full range of expressions and body movement needed to support a character's acting range in an animation. In a further example, a user of design computer 110 acting as an animator may employ one or more systems or tools to specify motion and position of one or more objects over time to produce an animation.

Object library 120 can include hardware and/or software elements configured for storing and accessing information related to objects used by the one or more design computers 110 during the various stages of a production process to produce CGI and animation. Some examples of object library 120 can include a file, a database, or other storage devices and mechanisms. Object library 120 may be locally accessible to the one or more design computers 110 or hosted by one or more external computer systems.

Some examples of information stored in object library 120 can include an object itself, metadata, object geometry, object topology, rigging, control data, animation data, animation cues, simulation data, texture data, lighting data, shader code, or the like. An object stored in object library 120 can include any entity that has an n-dimensional (e.g., 2D or 3D) surface geometry. The shape of the object can include a set of points or locations in space (e.g., object space) that make up the object's surface. Topology of an object can include the connectivity of the surface of the object (e.g., the genus or number of holes in an object) or the vertex/edge/face connectivity of an object.

The one or more object modeling systems 130 can include hardware and/or software elements configured for modeling one or more computer-generated objects. Modeling can include the creating, sculpting, and editing of an object. The one or more object modeling systems 130 may be invoked by or used directly by a user of the one or more design computers 110 and/or automatically invoked by or used by one or more processes associated with the one or more design computers 110. Some examples of software programs embodied as the one or more object modeling systems 130 can include commercially available high-end 3D computer graphics and 3D modeling software packages 3D STUDIO MAX and AUTODESK MAYA produced by Autodesk, Inc. of San Rafael, Calif.

In various embodiments, the one or more object modeling systems 130 may be configured to generated a model to include a description of the shape of an object. The one or more object modeling systems 130 can be configured to facilitate the creation and/or editing of features, such as non-uniform rational B-splines or NURBS, polygons and subdivision surfaces (or SubDivs), that may be used to describe the shape of an object. In general, polygons are a widely used model medium due to their relative stability and functionality. Polygons can also act as the bridge between NURBS and SubDivs. NURBS are used mainly for their ready-smooth appearance and generally respond well to deformations. SubDivs are a combination of both NURBS and polygons representing a smooth surface via the specification of a coarser piecewise linear polygon mesh. A single object may have several different models that describe its shape.

The one or more object modeling systems 130 may further generate model data (e.g., 2D and 3D model data) for use by other elements of system 100 or that can be stored in object library 120. The one or more object modeling systems 130 may be configured to allow a user to associate additional information, metadata, color, lighting, rigging, controls, or the like, with all or a portion of the generated model data.

The one or more object articulation systems 140 can include hardware and/or software elements configured to articulating one or more computer-generated objects. Articulation can include the building or creation of rigs, the rigging of an object, and the editing of rigging. The one or more object articulation systems 140 may be invoked by or used directly by a user of the one or more design computers 110 and/or automatically invoked by or used by one or more processes associated with the one or more design computers 110. Some examples of software programs embodied as the one or more object articulation systems 140 can include commercially available high-end 3D computer graphics and 3D modeling software packages 3D STUDIO MAX and AUTODESK MAYA produced by Autodesk, Inc. of San Rafael, Calif.

In various embodiments, the one or more articulation systems 140 can be configured to enable the specification of rigging for an object, such as for internal skeletal structures or eternal features, and to define how input motion deforms the object. One technique is called "skeletal animation," in which a character can be represented in at least two parts: a surface representation used to draw the character (called the skin) and a hierarchical set of bones used for animation (called the skeleton).

The one or more object articulation systems 140 may further generate articulation data (e.g., data associated with controls or animations variables) for use by other elements of system 100 or that can be stored in object library 120. The one or more object articulation systems 140 may be configured to allow a user to associate additional information, metadata, color, lighting, rigging, controls, or the like, with all or a portion of the generated articulation data.

The one or more object animation systems 150 can include hardware and/or software elements configured for animating one or more computer-generated objects. Animation can include the specification of motion and position of an object over time. The one or more object animation systems 150 may be invoked by or used directly by a user of the one or more design computers 110 and/or automatically invoked by or used by one or more processes associated with the one or more design computers 110. Some examples of software programs embodied as the one or more object animation systems 150 can include commercially available high-end 3D computer graphics and 3D modeling software packages 3D STUDIO MAX and AUTODESK MAYA produced by Autodesk, Inc. of San Rafael, Calif.

In various embodiments, the one or more animation systems 150 may be configured to enable users to manipulate controls or animation variables or utilized character rigging to specify one or more key frames of animation sequence. The one or more animation systems 150 generate intermediary frames based on the one or more key frames. In some embodiments, the one or more animation systems 150 may be configured to enable users to specify animation cues, paths, or the like according to one or more predefined sequences. The one or more animation systems 150 generate frames of the animation based on the animation cues or paths. In further embodiments, the one or more animation systems 150 may be configured to enable users to define animations using one or more animation languages, morphs, deformations, or the like.

The one or more object animations systems 150 may further generate animation data (e.g., inputs associated with controls or animations variables) for use by other elements of system 100 or that can be stored in object library 120. The one or more object animations systems 150 may be configured to allow a user to associate additional information, metadata, color, lighting, rigging, controls, or the like, with all or a portion of the generated animation data.

The one or more object simulation systems 160 can include hardware and/or software elements configured for simulating one or more computer-generated objects. Simulation can include determining motion and position of an object over time in response to one or more simulated forces or conditions. The one or more object simulation systems 160 may be invoked by or used directly by a user of the one or more design computers 110 and/or automatically invoked by or used by one or more processes associated with the one or more design computers 110. Some examples of software programs embodied as the one or more object simulation systems 160 can include commercially available high-end 3D computer graphics and 3D modeling software packages 3D STUDIO MAX and AUTODESK MAYA produced by Autodesk, Inc. of San Rafael, Calif.

In various embodiments, the one or more object simulation systems 160 may be configured to enables users to create, define, or edit simulation engines, such as a physics engine or physics processing unit (PPU/GPGPU) using one or more physically-based numerical techniques. In general, a physics engine can include a computer program that simulates one or more physics models (e.g., a Newtonian physics model), using variables such as mass, velocity, friction, wind resistance, or the like. The physics engine may simulate and predict effects under different conditions that would approximate what happens to an object according to the physics model. The one or more object simulation systems 160 may be used to simulate the behavior of objects, such as hair, fur, and cloth, in response to a physics model and/or animation of one or more characters and objects within a computer-generated scene.

The one or more object simulation systems 160 may further generate simulation data (e.g., motion and position of an object over time) for use by other elements of system 100 or that can be stored in object library 120. The generated simulation data may be combined with or used in addition to animation data generated by the one or more object animation systems 150. The one or more object simulation systems 160 may be configured to allow a user to associate additional information, metadata, color, lighting, rigging, controls, or the like, with all or a portion of the generated simulation data.

The one or more object rendering systems 170 can include hardware and/or software element configured for "rendering" or generating one or more images of one or more computer-generated objects. "Rendering" can include generating an image from a model based on information such as geometry, viewpoint, texture, lighting, and shading information. The one or more object rendering systems 170 may be invoked by or used directly by a user of the one or more design computers 110 and/or automatically invoked by or used by one or more processes associated with the one or more design computers 110. One example of a software program embodied as the one or more object rendering systems 170 can include PhotoRealistic RenderMan, or PRMan, produced by Pixar Animations Studios of Emeryville, Calif.

In various embodiments, the one or more object rendering systems 170 can be configured to render one or more objects to produce one or more computer-generated images or a set of images over time that provide an animation. The one or more object rendering systems 170 may generate digital images or raster graphics images.

In various embodiments, a rendered image can be understood in terms of a number of visible features. Some examples of visible features that may be considered by the one or more object rendering systems 170 may include shading (e.g., techniques relating to how the color and brightness of a surface varies with lighting), texture-mapping (e.g., techniques relating to applying detail information to surfaces or objects using maps), bump-mapping (e.g., techniques relating to simulating small-scale bumpiness on surfaces), fogging/participating medium (e.g., techniques relating to how light dims when passing through non-clear atmosphere or air) shadows (e.g., techniques relating to effects of obstructing light), soft shadows (e.g., techniques relating to varying darkness caused by partially obscured light sources), reflection (e.g., techniques relating to mirror-like or highly glossy reflection), transparency or opacity (e.g., techniques relating to sharp transmissions of light through solid objects), translucency (e.g., techniques relating to highly scattered transmissions of light through solid objects), refraction (e.g., techniques relating to bending of light associated with transparency), diffraction (e.g., techniques relating to bending, spreading and interference of light passing by an object or aperture that disrupts the ray), indirect illumination (e.g., techniques relating to surfaces illuminated by light reflected off other surfaces, rather than directly from a light source, also known as global illumination), caustics (e.g., a form of indirect illumination with techniques relating to reflections of light off a shiny object, or focusing of light through a transparent object, to produce bright highlights on another object), depth of field (e.g., techniques relating to how objects appear blurry or out of focus when too far in front of or behind the object in focus), motion blur (e.g., techniques relating to how objects appear blurry due to high-speed motion, or the motion of the camera), non-photorealistic rendering (e.g., techniques relating to rendering of scenes in an artistic style, intended to look like a painting or drawing), or the like.

The one or more object rendering systems 170 may further render images (e.g., motion and position of an object over time) for use by other elements of system 100 or that can be stored in object library 120. The one or more object rendering systems 170 may be configured to allow a user to associate additional information or metadata with all or a portion of the rendered image. Object library 120 can include hardware and/or software elements configured for storing and accessing information Recorded Media In various embodiments, system 100 may include one or more hardware elements and/or software elements, components, tools, or processes, embodied as the one or more design computers 110, object library 120, the one or more object modeler systems 130, the one or more object articulation systems 140, the one or more object animation systems 150, the one or more object simulation systems 160, and/or the one or more object rendering systems 170 that provide one or more tools for copying pose or animation frame data associated with recorded media.

In one embodiment, system 100 allow animators to easily share and reuse character poses such as gestures, expressions, and mouth shapes. System 100 may store a large inventory of animated videos (such as in object libraries 120) and provide one or more mechanisms that enable users (such as animators) to view the animated videos). In one aspect, system 100 enables users to bring in a desired pose in a matter of a few mouse clicks directly from a clip of prerecorded media in the library. In one aspect, a pose at the current playhead of the playback tool is copied into a software buffer of an animation tool hosted by design computer(s) 110 and then pasted into a character. Thus, the animator may copy a pose exactly as he/she is seeing visually.

Figure 2:
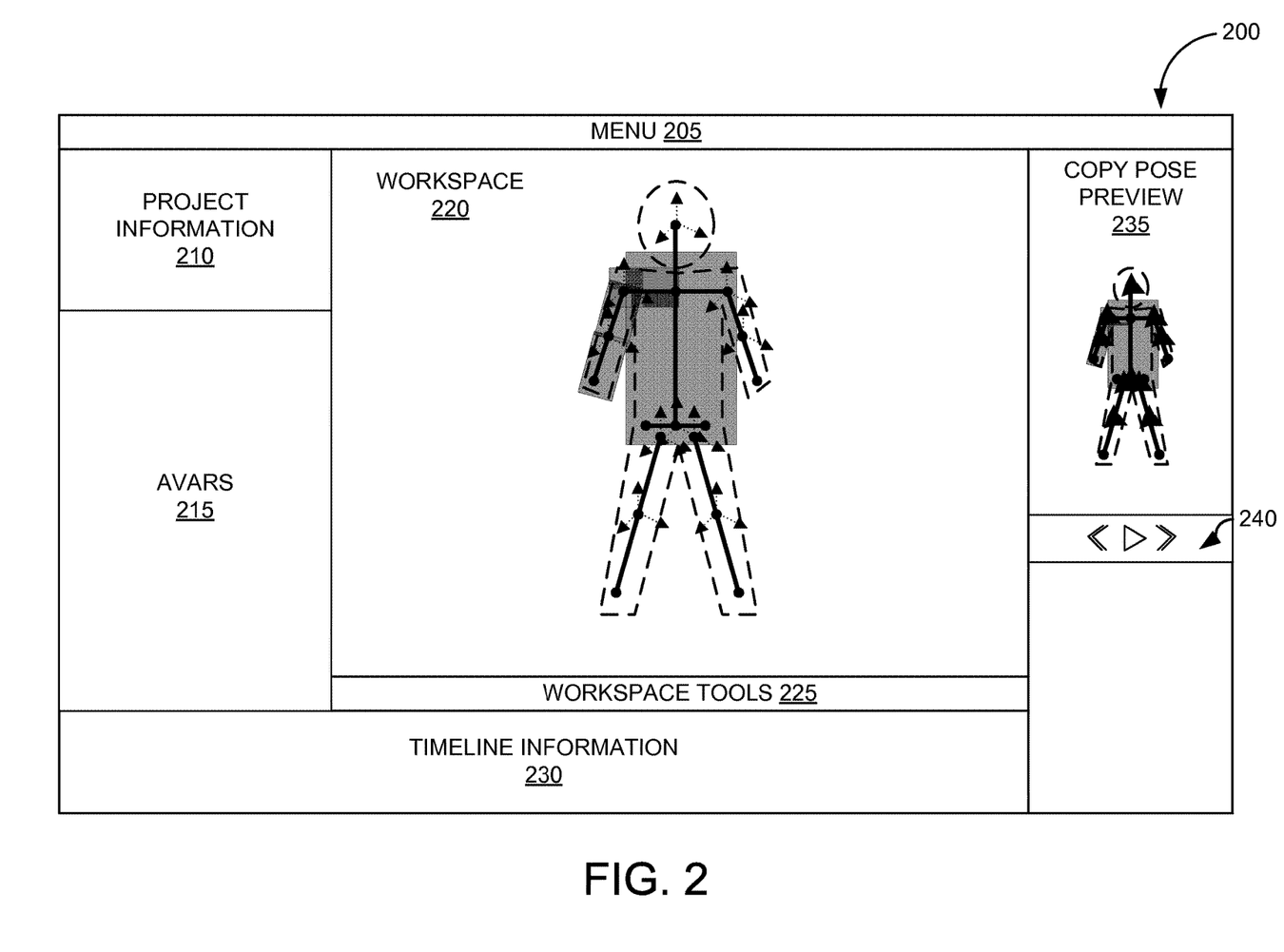
FIG. 2 is an illustration of a user interface for copying pose or animation frame data in one embodiment.

FIG. 2 is an illustration of user interface 200 for copying pose or animation frame data in one embodiment. User interface 200 that may incorporate various embodiments or implementations of the one or more inventions presented within this disclosure. User interface 200 is merely illustrative of an embodiment or implementation of an invention disclosed herein should not limit the scope of any invention as recited in the claims. One of ordinary skill in the art may recognize through this disclosure and the teachings presented herein other variations, modifications, and/or alternatives to those embodiments or implementations illustrated in the figures.

User interface 200 generally includes a variety of user interface elements commonly used to animate computer-generated characters. In this example, user interface 200 includes menu 205, project information panel 210, avars panel 215, workspace 220, workspace tools 225, timeline information 230, copy pose preview 235, and tools 240. In this embodiment, menu 205 provides access to one or more settings, functionality, and features of an animation tool. Project information panel 210 and avars panel 215 provide information about the current project and animation variables or controls used to animate characters or other objects in workspace 220.

Workspace 220 provides one or more views, tools, and functionality for animating characters or objects. In this example, a bipedial humanoid character is displayed in workspace 220. An animator may interact with one or more visual representations of controls, avars, deformers, etc. that manipulate the character into one or more poses. Workspace tools 225 may provide one or more tools or functionality for interacting with characters or objects being animated in workspace 220. Timeline information 230 provides information related to how the character has been animated over one or more animation frames. A user may scroll back and forth in time to review animation frame data at various points in time in an animation sequence or animation cue.

In various embodiments, copy pose preview panel 235 provides access to an a view of prerecorded media, such as from library of recorded media as discussed above. Copy pose preview panel 235 may be controlled by or manipulated by tools 240, much like controls of a VCR including play, stop, pause, fast-forward, and rewind. Copy pose preview panel 235 may be integrated with an animation tool or be a separate program.

In this example, a user or animator may select from one of a plurality of prerecorded videos, render samples, or other prerecorded media. Copy pose preview panel 235 displays the prerecorded media (e.g., advancing 24/30 fps) until the animator sees something desirable. In one aspect, a pose at the current playhead of tool 240 is copied into a software buffer (e.g., a clipboard) of the animation tool. As discussed further below, the copied pose may be stored in the buffer using a variety of techniques. In one embodiment, the copied pose may be referenced by one or more identifiers. In another embodiment, all or part of animation data related to the pose may be copied into the buffer. In yet another embodiment, selection criteria may be referenced such that the desired pose information may be obtained from an asset management system.

Once the copied pose or animation frame data is available to the animation tool in one form or another, the pose or animation frame data may be pasted into the character or object. Thus, the animator may copy a pose exactly as he/she is seeing visually in copy pose preview panel 235. This process allows animators to quickly develop new shots in addition to more readily maintaining the look and feel personality of characters.

Copy and Paste

Figure 3:
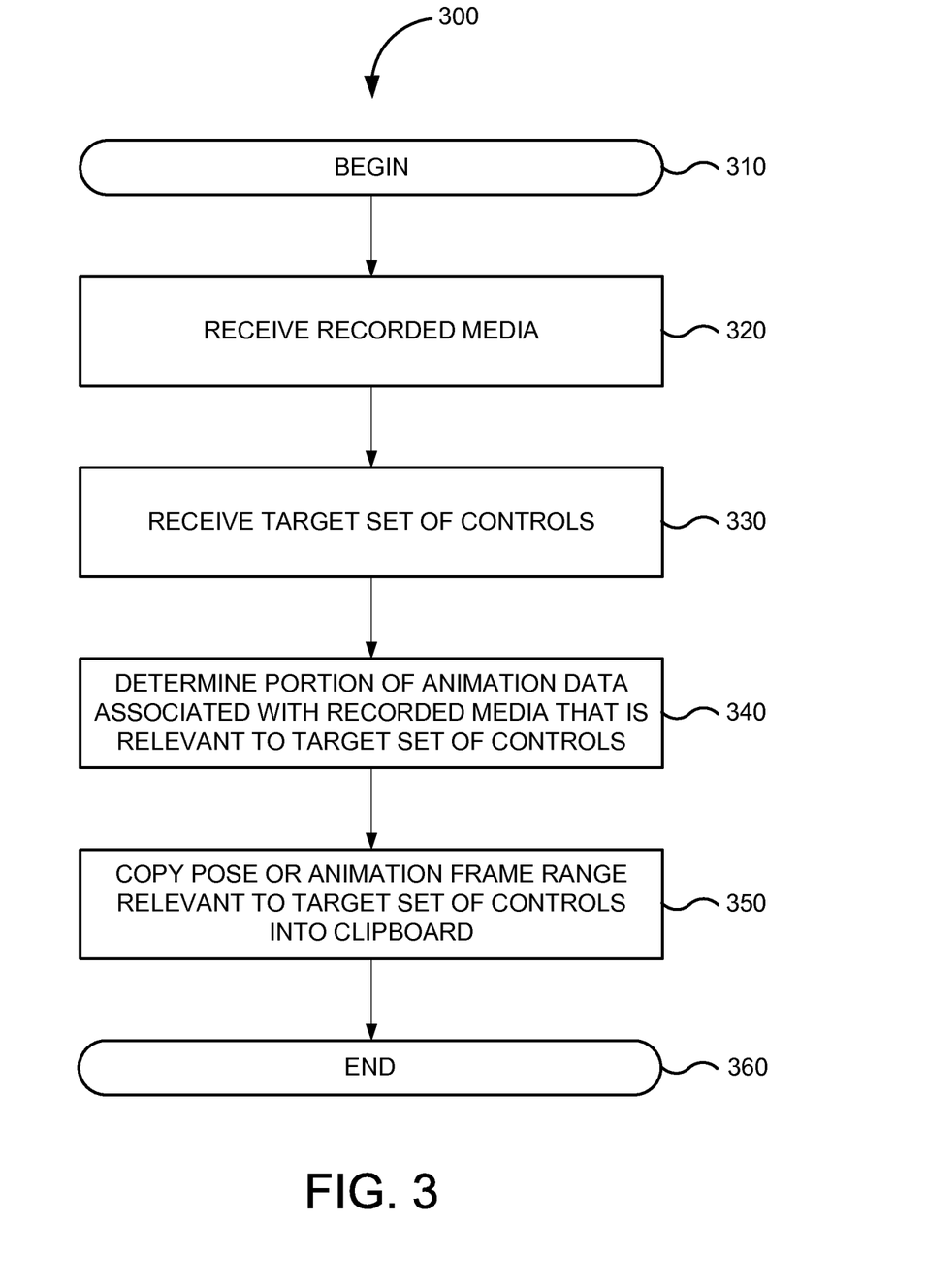
FIG. 3 is a flowchart of a method for copying pose or animation frame in one embodiment.

FIG. 3 is a flowchart of a method for copying pose or animation frame in one embodiment. Implementations of or processing in method 300 depicted in FIG. 3 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 300 depicted in FIG. 3 begins in step 310.

In step 320, prerecorded media is received. Prerecorded media as used herein refers to at least image data. Prerecorded media may include a time-based sequence of one or more images. In addition to image data, prerecorded media may include additional multimedia information, such as audio information, time code information, additional metadata, and the like. In one embodiment, an animation may select one of a plurality of prerecorded video files in a video library. The animator may initiate playback of the prerecorded media until a desired pose of a character is in view.

In step 330, a set of one or more target controls are received. Controls may refer to animation controls, animation variables, rigging, and the like. In one embodiment, an animator may select one or more controls using a selection tool of an animation program onto which the animations desires to copy a pose or animation frame data from the received prerecorded media.

In step 340, a portion of animation data associated with the prerecorded media is determined that is relevant to the set of target controls. For example, the prerecorded media may include a reference to animation data associated with one or more characters or objects included in image data. System 100 may retrieve all or part of the animation data using the incorporated reference. In another example, the prerecorded media may include animation data encoded within the video file. System 100 may decode the animation data during playback such that the animation data is readily available to an animation tool. In yet another embodiment, the prerecorded media may include image data rendered using one or more rendering systems. The prerecorded media may not include a reference or the actual animation data, however, system 100 may derive selection criteria based on the animation data (such as from timecode information or other metadata) to be used to select the animation data used to render a video clip from an asset management system.

In various embodiments, system 100 may automatically detect to which target controls the animation data associated with the prerecorded media pertains. The animation data may include a one-to-one mapping between animation controls used to create the animation data and the set of target controls. Such mapping may include references to common control names or other references. In some embodiments, an animator may specify the mapping between controls used to create the animation data associated with a prerecorded video clip and the target controls such that the appropriate animation data is copied from one to the other.

In step 350, a pose or animation frame range data that is relevant to the target set of controls is copied into a clipboard. In various embodiments, an animation tool imports an animation cue for each of the target controls. The animation cue may include values or knots specifying values for each control in a set of controls over a specified time period. In one aspect, a pose may include values for controls at a predetermined time period. In yet another aspect, an animation frame range may include animation data associated with a plurality of frames.

In various embodiments, the relevant animation data may be stored or cached in the clipboard accessible to an animation tool. The animation tool may retrieve the relevant animation data from the clipboard and incorporate the cached animation data into the animation data for the current animation project. In one aspect, animation data itself is not copied into the clipboard but one or more references or notations to the data.

Accordingly, an animator may copy a pose exactly as he/she is seeing visually in the prerecorded media. As discussed above, animators can choose a pose or animation frame range from an entire inventory of available animated videos. This provides a more efficient method for selecting a pose or range of poses since the user can easily choose and pick a pose from a large inventory of animated videos and bring in a desired pose quite simply using a copy and paste mechanism. FIG. 3 ends in step 360.

Encoding Animation Data

Figure 4:
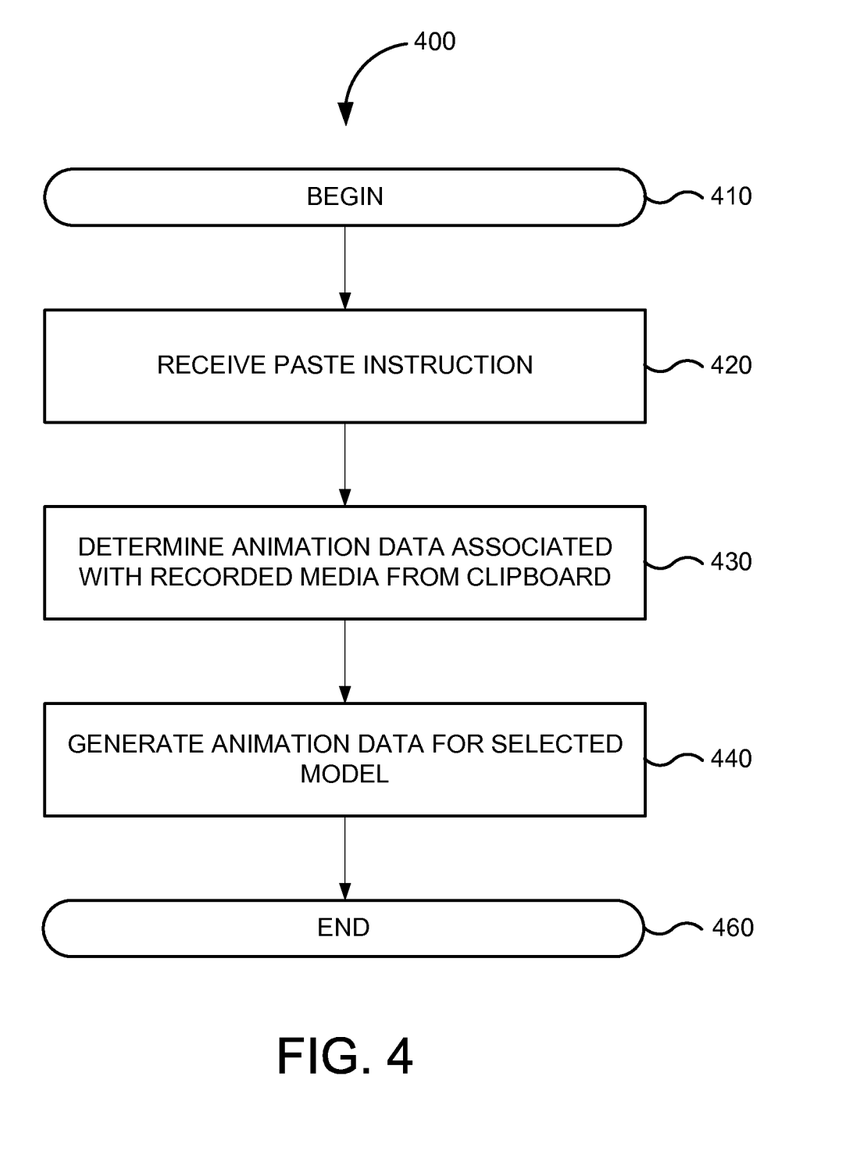
FIG. 4 is a flowchart of a method for determining from where to copy pose or animation frame in one embodiment.

FIG. 4 is a flowchart of method 400 for determining from where to copy pose or animation frame in one embodiment. Implementations of or processing in method 400 depicted in FIG. 4 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 400 depicted in FIG. 4 begins in step 410.

In step 420, a paste instruction is received. For example, an animation may view a prerecorded clip of an animation and pause the clip at a scene that includes a desired pose of a character. In another example, an animation may mark bounds of a desired animation frame range in prerecorded clip of the animation. The animator may "copy" the animation data by selecting one or more in-build functions of an animation tool or a function of a plug-in to the animation tool. The animation data or one or more references for the discovery thereof may be copied into a clipboard accessible to the animation tool.

The animator may then similarly "paste" the animation data by selecting one or more in-build functions of an animation tool or a function of a plug-in to the animation tool. The animation tool or associated functionality then initiates the copy process.

Figure 5:
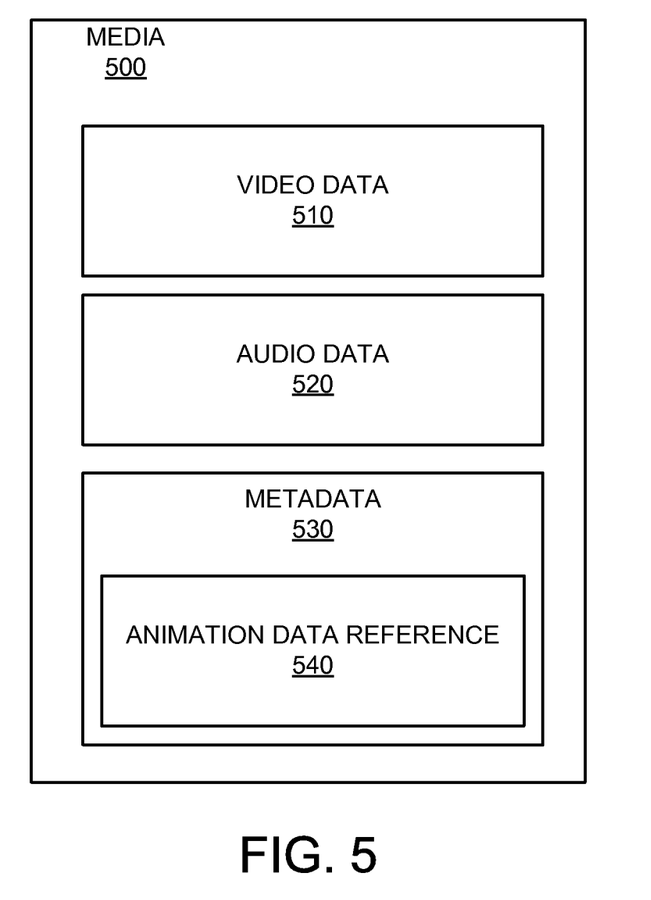
FIGS. 5-7 are block diagrams of recorded media with which animation data may be associated in various embodiments.
Figure 6:
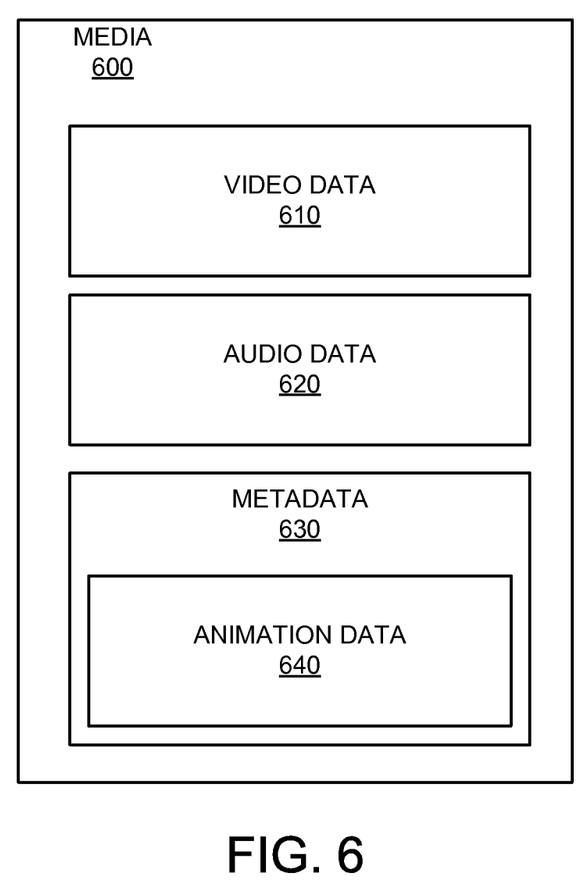
Figure 7:
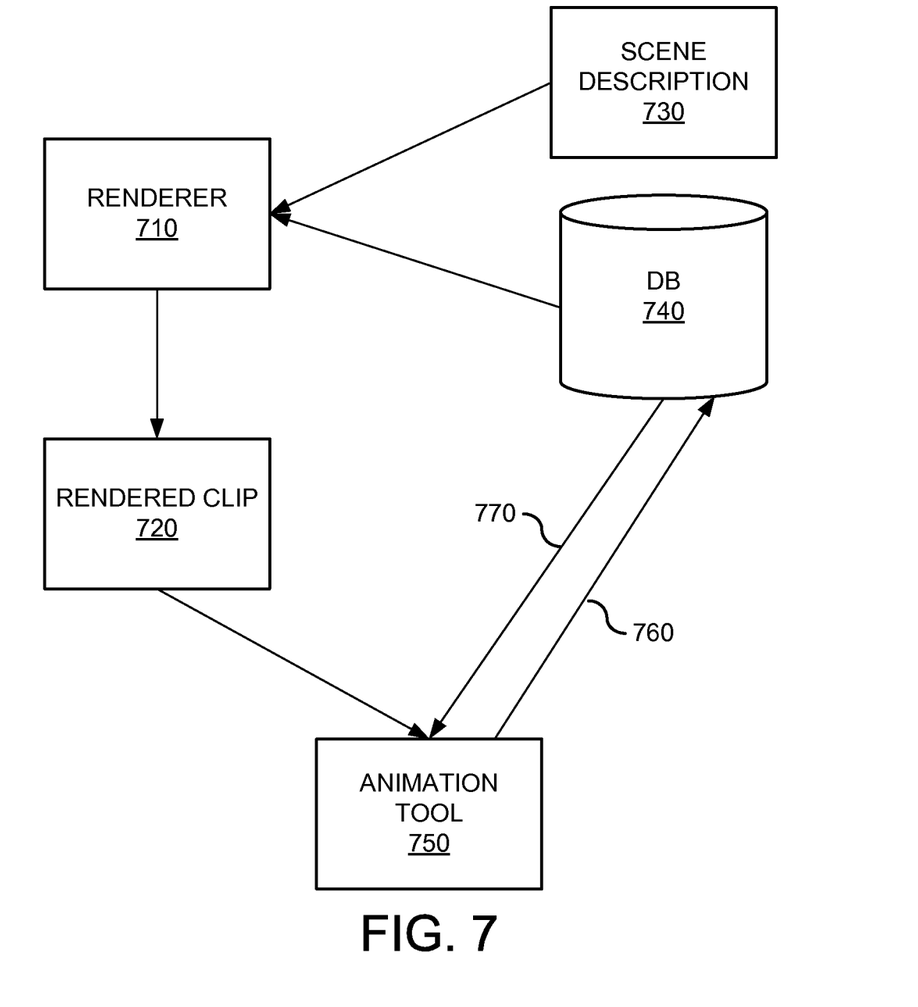

In order to copy the correct data, the animation tool needs to know where the data can be found. In step 430, animation data associated with the prerecorded media is determined. FIGS. 5-7 are block diagrams of recorded media with which animation data may be associated in various embodiments.

In FIG. 5, media 500 includes a reference to the animation data needed by the animation tool. In this example, media 500 includes video data 510 (e.g., a sequence of one or more images), audio data 520, and metadata 530. Media 500 may be embodied in one or more known digital container formats, such as containers exclusive to still images (e.g., FITS [Flexible Image Transport System] and TIFF [Tagged Image File Format].) as well as containers can hold many types of audio and video, as well as other media. Some examples of multi-media containers are audio-video interleaved file (AVI), Flash video (FLV, F4V), Matroska (MKV), the QuickTime File Format (standard QuickTime video container from Apple Inc.), MPEG program stream, MPEG-2 transport stream (a.k.a. MPEG-TS), MP4, Ogg, RM (Real-Media), and the like.

Metadata 530 may include information about media 500, video data 510, and audio data 520. Metadata 530 may further include animation data reference 540. Animation data reference 540 may include one or more references, such as program links, uniform resource locators (URLs), database queries, and the like that reference directly or indirectly the location of animation data associated with media 500. Accordingly, animation data associated with the prerecorded media may be determined directly or indirectly from animation data reference 540.

In FIG. 6, media 600 includes the actual animation data needed by the animation tool. In this example, media 600 includes video data 610, audio data 620, and metadata 630. Metadata 630 may include information about media 600, video data 610, and audio data 620. Metadata 630 may further include animation data 640. Animation data 640 may be encoded utilizing one or more encoding schemes appropriate for media 600. Accordingly, animation data 640 associated with the prerecorded media may be extracted directly from media 600.

In FIG. 7, renderer 710 generates rendered clip 720 based on scene description data 730. Scene description data 730 may specify objects, camera angles, lighting and texture information, and the like to include in rendered clip 720. Scene description data 730 may specify how to access information described in the scene together with animation data stored for the objects in asset management database 740. In this example, rendered clip 720 may be viewed in animation tool 750. Animation tool 750 may determine animation data associated with rendered clip 720 based on information associated with rendered clip 720. For example, rendered clip may have or be associated with information that indicates the time at which one or more versions of animation data stored in database 740 where used to create rendered clip 720. Animation tool 750 may generate selection criteria based on the information for selecting animation data from database 740. Animation tool 750 may generate one or more queries 760 to retrieve animation data 770 from database 740.

Returning to FIG. 4, in step 440, clipboard information is generated based on the determined animation data. In the example of media 500 of FIG. 5, animation data reference 540 may have been placed in the clipboard during the copy operation. Animation data reference 540 may be replaced in the clipboard during the paste operation in response to retrieving the animation data referenced by animation data reference 540.

In the example of media 600 of FIG. 6, animation data may be placed in the clipboard during the paste operation in response to extracting the animation data from media 600. In the example of FIG. 7, animation data 760 may be placed in the clipboard in response to one or more queries 750 to database 740. FIG. 4 ends in step 460.

Figure 8:
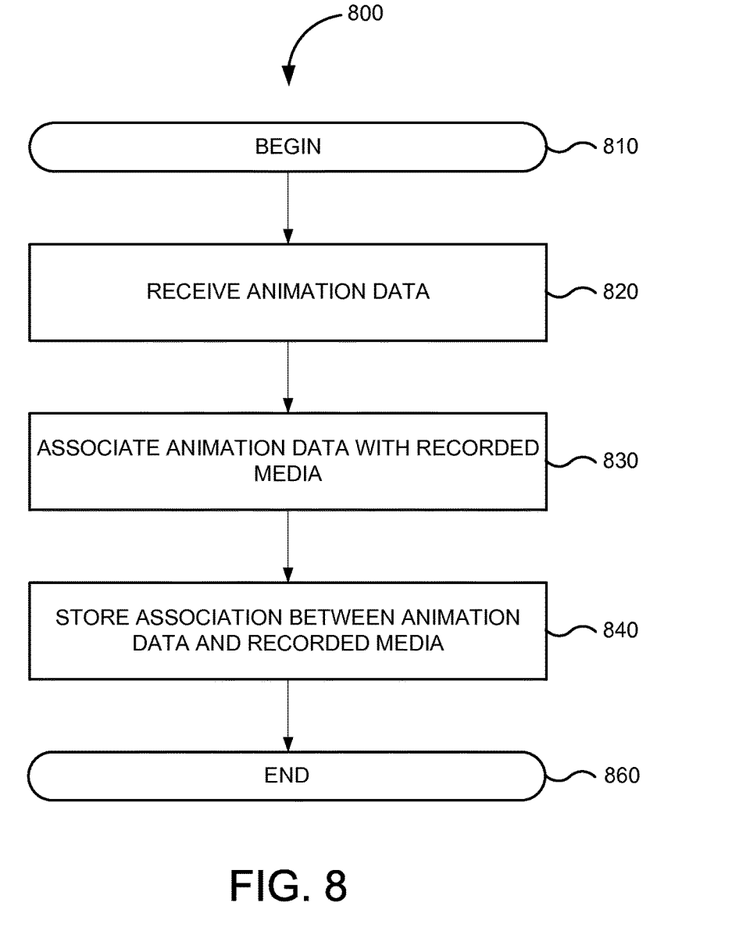
FIG. 8 is a flowchart of a method for associating animation data with recorded media in one embodiment.

FIG. 8 is a flowchart of method 400 for associating animation data with recorded media in one embodiment. Implementations of or processing in method 800 depicted in FIG. 8 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 800 depicted in FIG. 8 begins in step 810.

In step 820, animation data is received. In step 830, associate animation data with recorded media. In step 840, the association between the animation data and the recorded media is stored. In one aspect, the animation data may be export from an animation to into an asset management system. The recorded media may further be stored in the asset management system or in a separate video library. As discussed above, the stored association between the animation data and the recorded media may be embodied as a reference to the animation data or the animation data may be encoded within the recorded media.

In some embodiments, the animation data may be dynamically associated with the recorded media (such as in the case of a rendered clip) using selecting criteria derived from aspects of the recorded media. FIG. 8 ends in step 860.

Therefore, animators can easily share and reuse character poses such as gestures, expressions, and mouth shapes. According to various embodiments, an animator can easily set up these hookup poses by animator copying a pose directly from a clip of prerecorded media. In one aspect, a pose at the current playhead of the playback tool is copied into a software buffer of an animation tool and then pasted into a character. Thus, the animator may copy a pose exactly as he/she is seeing visually. In various aspects, animators can choose a pose from an entire inventory of available animated videos. This provides a more efficient method for selecting a pose since the user can easily choose and pick a pose from a large inventory of animated videos and bring in a desired pose in a matter of a few mouse clicks.

CONCLUSION

Figure 9:
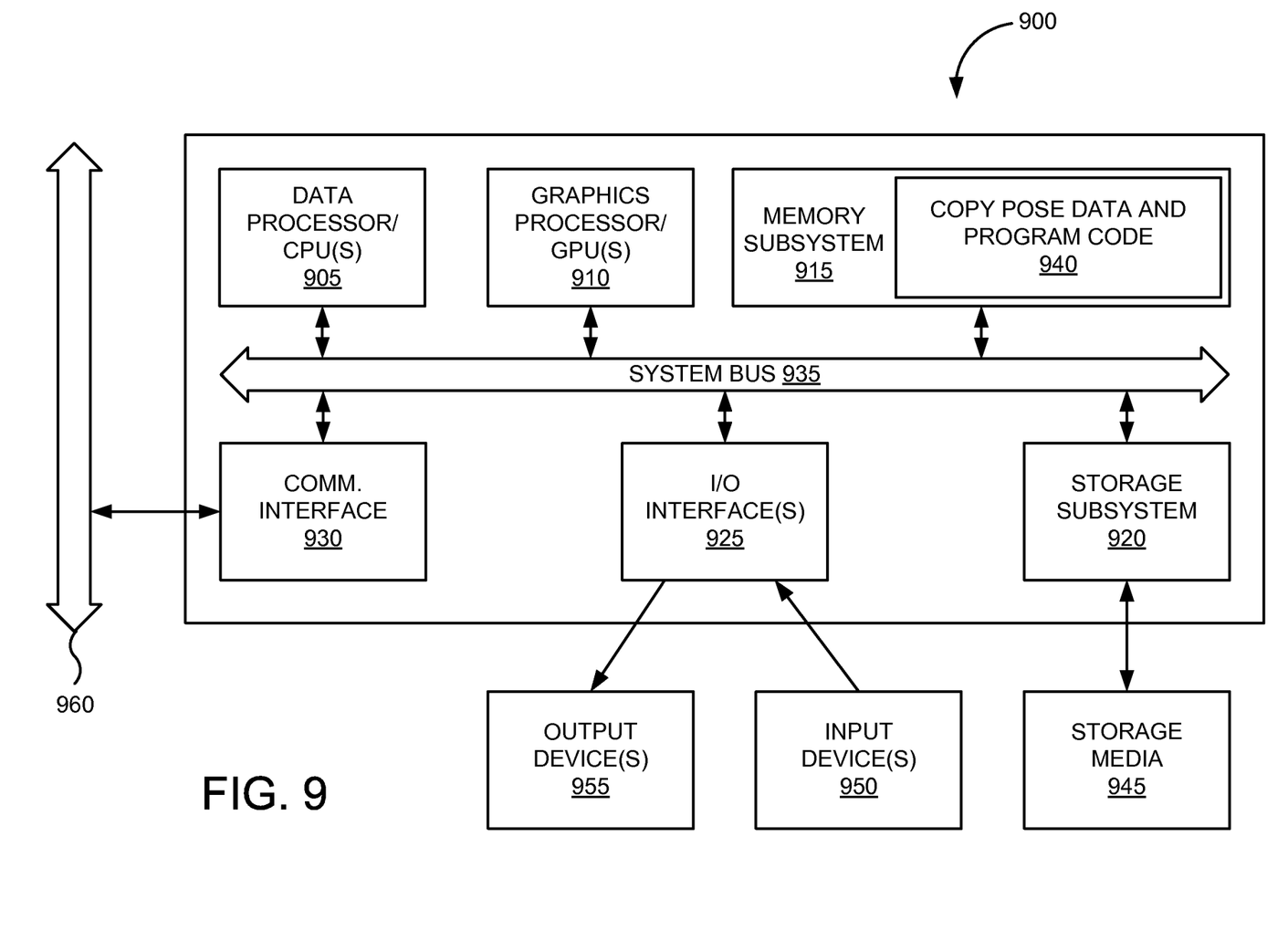
FIG. 9 is a block diagram of a computer system or information processing device that may incorporate an embodiment, be incorporated into an embodiment, or be used to practice any of the innovations, embodiments, and/or examples found within this disclosure

FIG. 9 is a block diagram of computer system 900 that may incorporate an embodiment, be incorporated into an embodiment, or be used to practice any of the innovations, embodiments, and/or examples found within this disclosure. FIG. 9 is merely illustrative of a computing device, general-purpose computer system programmed according to one or more disclosed techniques, or specific information processing device for an embodiment incorporating an invention whose teachings may be presented herein and does not limit the scope of the invention as recited in the claims. One of ordinary skill in the art would recognize other variations, modifications, and alternatives.

Computer system 900 can include hardware and/or software elements configured for performing logic operations and calculations, input/output operations, machine communications, or the like. Computer system 900 may include familiar computer components, such as one or more one or more data processors or central processing units (CPUs) 905, one or more graphics processors or graphical processing units (GPUs) 910, memory subsystem 915, storage subsystem 920, one or more input/output (I/O) interfaces 925, communications interface 930, or the like. Computer system 900 can include system bus 935 interconnecting the above components and providing functionality, such connectivity and inter-device communication. Computer system 900 may be embodied as a computing device, such as a personal computer (PC), a workstation, a mini-computer, a mainframe, a cluster or farm of computing devices, a laptop, a notebook, a netbook, a PDA, a smartphone, a consumer electronic device, a gaming console, or the like.

The one or more data processors or central processing units (CPUs) 905 can include hardware and/or software elements configured for executing logic or program code or for providing application-specific functionality. Some examples of CPU(s) 905 can include one or more microprocessors (e.g., single core and multi-core) or micro-controllers. CPUs 905 may include 4-bit, 8-bit, 12-bit, 16-bit, 32-bit, 64-bit, or the like architectures with similar or divergent internal and external instruction and data designs. CPUs 905 may further include a single core or multiple cores. Commercially available processors may include those provided by Intel of Santa Clara, Calif. (e.g., x86, x86_64, PENTIUM, CELERON, CORE, CORE 2, CORE ix, ITANIUM, XEON, etc.), by Advanced Micro Devices of Sunnyvale, Calif. (e.g., x86, AMD_64, ATHLON, DURON, TURION, ATHLON XP/64, OPTERON, PHENOM, etc).

Commercially available processors may further include those conforming to the Advanced RISC Machine (ARM) architecture (e.g., ARMv7-9), POWER and POWERPC architecture, CELL architecture, and or the like. CPU(s) 905 may also include one or more field-gate programmable arrays (FPGAs), application-specific integrated circuits (ASICs), or other microcontrollers. The one or more data processors or central processing units (CPUs) 905 may include any number of registers, logic units, arithmetic units, caches, memory interfaces, or the like. The one or more data processors or central processing units (CPUs) 905 may further be integrated, irremovably or moveably, into one or more motherboards or daughter boards.

The one or more graphics processor or graphical processing units (GPUs) 910 can include hardware and/or software elements configured for executing logic or program code associated with graphics or for providing graphics-specific functionality. GPUs 910 may include any conventional graphics processing unit, such as those provided by conventional video cards. Some examples of GPUs are commercially available from NVIDIA, ATI, and other vendors. In various embodiments, GPUs 910 may include one or more vector or parallel processing units. These GPUs may be user programmable, and include hardware elements for encoding/decoding specific types of data (e.g., video data) or for accelerating 2D or 3D drawing operations, texturing operations, shading operations, or the like. The one or more graphics processors or graphical processing units (GPUs) 910 may include any number of registers, logic units, arithmetic units, caches, memory interfaces, or the like. The one or more data processors or central processing units (CPUs) 905 may further be integrated, irremovably or moveably, into one or more motherboards or daughter boards that include dedicated video memories, frame buffers, or the like.

Memory subsystem 915 can include hardware and/or software elements configured for storing information. Memory subsystem 915 may store information using machine-readable articles, information storage devices, or computer-readable storage media. Some examples of these articles used by memory subsystem 970 can include random access memories (RAM), read-only-memories (ROMS), volatile memories, non-volatile memories, and other semiconductor memories. In various embodiments, memory subsystem 915 can include copy pose data and program code 940.

Storage subsystem 920 can include hardware and/or software elements configured for storing information. Storage subsystem 920 may store information using machine-readable articles, information storage devices, or computer-readable storage media. Storage subsystem 920 may store information using storage media 945. Some examples of storage media 945 used by storage subsystem 920 can include floppy disks, hard disks, optical storage media such as CD-ROMS, DVDs and bar codes, removable storage devices, networked storage devices, or the like. In some embodiments, all or part of copy pose data and program code 940 may be stored using storage subsystem 920.

In various embodiments, computer system 900 may include one or more hypervisors or operating systems, such as WINDOWS, WINDOWS NT, WINDOWS XP, VISTA, WINDOWS 7 or the like from Microsoft of Redmond, Wash., Mac OS or Mac OS X from Apple Inc. of Cupertino, Calif., SOLARIS from Sun Microsystems, LINUX, UNIX, and other UNIX-based or UNIX-like operating systems. Computer system 900 may also include one or more applications configured to execute, perform, or otherwise implement techniques disclosed herein. These applications may be embodied as copy pose data and program code 940. Additionally, computer programs, executable computer code, human-readable source code, shader code, rendering engines, or the like, and data, such as image files, models including geometrical descriptions of objects, ordered geometric descriptions of objects, procedural descriptions of models, scene descriptor files, or the like, may be stored in memory subsystem 915 and/or storage subsystem 920.

The one or more input/output (I/O) interfaces 925 can include hardware and/or software elements configured for performing I/O operations. One or more input devices 950 and/or one or more output devices 955 may be communicatively coupled to the one or more I/O interfaces 925.

The one or more input devices 950 can include hardware and/or software elements configured for receiving information from one or more sources for computer system 900. Some examples of the one or more input devices 950 may include a computer mouse, a trackball, a track pad, a joystick, a wireless remote, a drawing tablet, a voice command system, an eye tracking system, external storage systems, a monitor appropriately configured as a touch screen, a communications interface appropriately configured as a transceiver, or the like. In various embodiments, the one or more input devices 950 may allow a user of computer system 900 to interact with one or more non-graphical or graphical user interfaces to enter a comment, select objects, icons, text, user interface widgets, or other user interface elements that appear on a monitor/display device via a command, a click of a button, or the like.

The one or more output devices 955 can include hardware and/or software elements configured for outputting information to one or more destinations for computer system 900. Some examples of the one or more output devices 955 can include a printer, a fax, a feedback device for a mouse or joystick, external storage systems, a monitor or other display device, a communications interface appropriately configured as a transceiver, or the like. The one or more output devices 955 may allow a user of computer system 900 to view objects, icons, text, user interface widgets, or other user interface elements.

A display device or monitor may be used with computer system 900 and can include hardware and/or software elements configured for displaying information. Some examples include familiar display devices, such as a television monitor, a cathode ray tube (CRT), a liquid crystal display (LCD), or the like.

Communications interface 930 can include hardware and/or software elements configured for performing communications operations, including sending and receiving data. Some examples of communications interface 930 may include a network communications interface, an external bus interface, an Ethernet card, a modem (telephone, satellite, cable, ISDN), (asynchronous) digital subscriber line (DSL) unit, FireWire interface, USB interface, or the like. For example, communications interface 930 may be coupled to communications network/external bus 980, such as a computer network, to a FireWire bus, a USB hub, or the like. In other embodiments, communications interface 930 may be physically integrated as hardware on a motherboard or daughter board of computer system 900, may be implemented as a software program, or the like, or may be implemented as a combination thereof.

In various embodiments, computer system 900 may include software that enables communications over a network, such as a local area network or the Internet, using one or more communications protocols, such as the HTTP, TCP/IP, RTP/RTSP protocols, or the like. In some embodiments, other communications software and/or transfer protocols may also be used, for example IPX, UDP or the like, for communicating with hosts over the network or with a device directly connected to computer system 900.

As suggested, FIG. 9 is merely representative of a general-purpose computer system appropriately configured or specific data processing device capable of implementing or incorporating various embodiments of an invention presented within this disclosure. Many other hardware and/or software configurations may be apparent to the skilled artisan which are suitable for use in implementing an invention presented within this disclosure or with various embodiments of an invention presented within this disclosure. For example, a computer system or data processing device may include desktop, portable, rack-mounted, or tablet configurations. Additionally, a computer system or information processing device may include a series of networked computers or clusters/grids of parallel processing devices. In still other embodiments, a computer system or information processing device may perform techniques described above as implemented upon a chip or an auxiliary processing board.

Various embodiments of any of one or more inventions whose teachings may be presented within this disclosure can be implemented in the form of logic in software, firmware, hardware, or a combination thereof. The logic may be stored in or on a machine-accessible memory, a machine-readable article, a tangible computer-readable medium, a computer-readable storage medium, or other computer/machine-readable media as a set of instructions adapted to direct a central processing unit (CPU or processor) of a logic machine to perform a set of steps that may be disclosed in various embodiments of an invention presented within this disclosure. The logic may form part of a software program or computer program product as code modules become operational with a processor of a computer system or an information-processing device when executed to perform a method or process in various embodiments of an invention presented within this disclosure. Based on this disclosure and the teachings provided herein, a person of ordinary skill in the art will appreciate other ways, variations, modifications, alternatives, and/or methods for implementing in software, firmware, hardware, or combinations thereof any of the disclosed operations or functionalities of various embodiments of one or more of the presented inventions.

The disclosed examples, implementations, and various embodiments of any one of those inventions whose teachings may be presented within this disclosure are merely illustrative to convey with reasonable clarity to those skilled in the art the teachings of this disclosure. As these implementations and embodiments may be described with reference to exemplary illustrations or specific figures, various modifications or adaptations of the methods and/or specific structures described can become apparent to those skilled in the art. All such modifications, adaptations, or variations that rely upon this disclosure and these teachings found herein, and through which the teachings have advanced the art, are to be considered within the scope of the one or more inventions whose teachings may be presented within this disclosure. Hence, the present descriptions and drawings should not be considered in a limiting sense, as it is understood that an invention presented within a disclosure is in no way limited to those embodiments specifically illustrated.

Accordingly, the above description and any accompanying drawings, illustrations, and figures are intended to be illustrative but not restrictive. The scope of any invention presented within this disclosure should, therefore, be determined not with simple reference to the above description and those embodiments shown in the figures, but instead should be determined with reference to the pending claims along with their full scope or equivalents.

What is claimed is:

1. A method for posing characters in an animated scene, the method comprising:
   receiving, at one or more computer systems, a video clip visually depicting one or more poses of a first animated character, wherein a pose of the first animated character is specified using one or more models, and wherein the first animated character is displayed as a first object in the video clip;
   receiving, at the one or more computer systems, user input indicative of a location in the video clip, wherein the first animated character is in a first pose at the location;
   determining, with one or more processors associated with the one or more computer systems, animation data associated with the first pose of the first animated character, wherein the animation data is associated with one or more first values of one or more first controls of the one or more models, wherein the one or more first controls are used to pose the first animated character, wherein the one or more first controls correspond to one or more second controls that are used to pose a second animated character, and wherein the second animated character is different than the first animated character;
   specifying, with the one or more processors associated with the one or more computer systems, one or more second values associated with the one or more second controls to be the one or more first values of the one or more first controls, wherein the one or more second values are specified such that a pose of the second animated character is the same as the first pose of the first animated character; and
   displaying the second animated character to have the pose copied from the first animated character, wherein the second animated character is displayed as a second object.

2. The method of claim 1 wherein determining, with the one or more processors associated with the one or more computer systems, the animation data associated with the first pose of the first animated character comprises retrieving a reference to the animation data from the video clip.

3. The method of claim 1 wherein determining, with the one or more processors associated with the one or more computer systems, the animation data associated with the first pose of the first animated character comprises extracting the animation data from the video clip.

4. The method of claim 1 wherein determining, with the one or more processors associated with the one or more computer systems, the animation data associated with the first pose of the first animated character comprises:
   determining selection criteria indicative of a selection made using the video clip; and
   querying an asset management system for the animation data based on the selection criteria.

5. The method of claim 1 wherein receiving, at the one or more computer systems, the user input indicative of the location in the video clip comprises receiving bounds of an animation frame range.

6. The method of claim 1 wherein the specifying comprises utilizing a copy and paste operation of an animation tool.

7. The method of claim 1 wherein receiving, at the one or more computer systems, the video clip visually depicting the one or more poses of the first animated character comprises selecting one of a plurality of video clips associated with the first animated character from a video library using an animation tool.

8. The method of claim 1 further comprising:
   displaying the video clip; and
   receiving a selection of the first animated character in the displayed video clip.

9. A non-transitory computer-readable medium storing computer-executable code for copying a pose of an animated character animated sequences, the non-transitory computer-readable medium comprising:
   code for receiving a video clip visually depicting one or more poses of a first animated character, wherein a pose of the first animated character is described using one or more models, and wherein the first animated character is displayed as a first object in the video clip;
   code for receiving user input indicative of a location in the video clip, wherein the first animated character is in a first pose at the location;
   code for determining animation data associated with the first pose of the first animated character, wherein the animation data is associated with one or more first values of one or more first controls of the one or more models, wherein the one or more first controls are used to pose the first animated character, wherein the one or more first controls correspond to one or more second controls that are used to pose a second animated character, and wherein the second animated character is different than the first animated character;
   code for specifying one or more second values associated with the one or more second controls to be the one or more first values of the one or more first controls, wherein the one or more second values are specified such that a pose of the second animated character is the same as the first pose of the first animated character; and
   code for displaying the second animated character to have the pose copied from the first animated character, wherein the second animated character is displayed as a second object.

10. The non-transitory computer-readable medium of claim 9 wherein the code for determining the animation data associated with the first pose of the first animated character comprises code for retrieving a reference to the animation data from the video clip.

11. The non-transitory computer-readable medium of claim 9 wherein the code for determining the animation data associated with the first pose of the first animated character comprises code for extracting the animation data from the video clip.

12. The non-transitory computer-readable medium of claim 9 wherein the code for determining the animation data associated with the first pose of the first animated character comprises:
   code for determining selection criteria indicative of a selection made using the video clip; and
   code for querying an asset management system for the animation data based on the selection criteria.

13. The non-transitory computer-readable medium of claim 9 wherein the code for receiving the user input indicative of the location in the video clip comprises code for receiving bounds of an animation frame range.

14. The non-transitory computer-readable medium of claim 9 wherein the code for the specifying comprises code for utilizing a copy and paste operation of an animation tool.

15. The non-transitory computer-readable medium of claim 9 wherein the code for receiving the video clip visually depicting the one or more poses of the first animated character comprises code for selecting one of a plurality of clips associated with the first animated character from a video library using a animation tool.

16. A system for posing characters in animated sequences, the system comprising:
   a processor; and
   a memory in communication with the processor and configured to store a set of instructions which when executed by the processor cause the processor to:
      receive a video clip visually depicting one or more poses of a first animated character, wherein a pose of the first animated character is described using one or more models, and wherein the first animated character is displayed as a first object in the video clip;
      receive user input indicative of a location in the video clip, wherein the first animated character is in a first pose at the location;
      determine animation data associated with the first pose of the first animated character, wherein the animation data is associated with one or more first values of one or more first controls of the one or more models, wherein the one or more first controls are used to pose the first animated character, wherein the one or more first controls correspond to one or more second controls that are used to pose a second animated character, and wherein the second animated character is different than the first animated character;
      specify one or more second values associated with the one or more second controls to be the one or more first values of the one or more first controls, wherein the one or more second values are specified such that a pose of the second animated character is the same as the first pose of the first animated character; and
      display the second animated character to have the pose copied from the first animated character, wherein the second animated character is displayed as a second object.

17. The system of claim 16 wherein to determine the animation data associated with the first pose of the first animated character, the processor is configured to retrieve a reference to the animation data from the video clip.

18. The system of claim 16 wherein to determine the animation data associated with the first pose of the first animated character, the processor is configured to extract the animation data from the video clip.

19. The system of claim 16 wherein to determine the animation data associated with the first pose of the first animated character, the processor is configured to:
   determine selection criteria indicative of a selection made using the video clip; and
   query an asset management system for the animation data based on the selection criteria.

20. The system of claim 16 wherein the specifying comprises code for utilizing a copy and paste operation of an animation tool.

* * * * *